US009709984B2

(12) United States Patent
Cudak et al.

(10) Patent No.: US 9,709,984 B2
(45) Date of Patent: Jul. 18, 2017

(54) ADMINISTERING A RECALL BY AN AUTONOMOUS VEHICLE

(71) Applicant: LENOVO ENTERPRISE SOLUTIONS (SINGAPORE) PTE. LTD., Singapore (SG)

(72) Inventors: Gary D. Cudak, Creedmoor, NC (US); Christopher J. Hardee, Raleigh, NC (US); Adrian X. Rodriguez, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 229 days.

(21) Appl. No.: 14/183,917

(22) Filed: Feb. 19, 2014

(65) Prior Publication Data
US 2015/0235480 A1     Aug. 20, 2015

(51) Int. Cl.
G07C 5/00 (2006.01)
G05D 1/00 (2006.01)
G06Q 10/00 (2012.01)
G05D 1/02 (2006.01)

(52) U.S. Cl.
CPC ......... *G05D 1/0027* (2013.01); *G05D 1/0297* (2013.01); *G06Q 10/20* (2013.01); *G05D 2201/0213* (2013.01)

(58) Field of Classification Search
CPC ..... G05D 1/0027; G05D 1/0297; G06Q 10/20
USPC .......................................................... 701/2
See application file for complete search history.

(56) References Cited

U.S. PATENT DOCUMENTS

| 5,646,843 | A | 7/1997 | Gudat et al. |
| 7,142,101 | B2 | 11/2006 | Morris |
| 7,599,995 | B1 | 10/2009 | Fernandez et al. |
| 8,237,389 | B2 | 8/2012 | Fitch et al. |
| 2002/0016655 | A1* | 2/2002 | Joao ............... G07C 5/008 701/33.4 |
| 2002/0112179 | A1 | 8/2002 | Riordan et al. |
| 2006/0106522 | A1 | 5/2006 | Obradovich |

(Continued)

FOREIGN PATENT DOCUMENTS

WO     WO/2005/010648 A2     2/2005

OTHER PUBLICATIONS

Fernandes et al., "Vehicle Communications: A Short Survey", Proceedings of the International Association for Development of the Information Society's (IADIS) Multi-Conference on Computer Science and Information Systems, Part II (International Telecommunications, Networks and Systems)(MCCSIS), Jul. 2007, pp. 134-138, IADIS Press, Lisbon, Portugal.

(Continued)

*Primary Examiner* — Redhwan K Mawari
*Assistant Examiner* — Rodney P King
(74) *Attorney, Agent, or Firm* — Brandon C. Kennedy; Jason A. Friday; Kennedy Lenart Spraggins LLP (57) ABSTRACT

Administering a recall by an autonomous vehicle, including: receiving, by a vehicle management module, a recall message identifying a component of the autonomous vehicle that is subject to the recall; adjusting, by the vehicle management module, a vehicle capability in dependence upon the component of the autonomous vehicle that is subject to the recall; determining, by the vehicle management module, a recall response plan in dependence upon the adjusted vehicle capability; and executing, by the vehicle management module, the recall response plan.

15 Claims, 5 Drawing Sheets

(56) References Cited

U.S. PATENT DOCUMENTS

| | | |
|---|---|---|
| 2007/0069004 A1 | 3/2007 | Adler |
| 2010/0179720 A1 | 7/2010 | Lin et al. |
| 2012/0059724 A1 | 3/2012 | Nichols et al. |
| 2012/0083959 A1* | 4/2012 | Dolgov ................ G05D 1/0214 701/23 |
| 2012/0185399 A1* | 7/2012 | Draper ................ G06Q 30/014 705/303 |
| 2013/0006769 A1 | 1/2013 | Schalk et al. |

OTHER PUBLICATIONS

Khan, "A Survey of Vehicular Communication", Projects Post, Electrical Engineering Community (eeweb.com) online, May 2011, 37 pages, Aspen Labs, LLC, URL: http://www.eeweb.com/project/sikandar_khan/report-on-vechicle-communication.

Wilson, "Why Are There So Many Car Recalls?", PopularMechanics.com (online), Apr. 2013, 4 pages, URL: http://www.popularmechanics.com/cars/news/industry/why-are-there-so-many-car-recalls-15413366.

* cited by examiner

ADMINISTERING A RECALL BY AN AUTONOMOUS VEHICLE

BACKGROUND OF THE INVENTION

Field of the Invention

The field of the invention is data processing, or, more specifically, methods, apparatus, and products for administering a recall by an autonomous vehicle.

Description of Related Art

Autonomous cars are becoming closer to being a mainstream product. States are now passing laws to allow use of autonomous vehicles. These vehicles are very advanced and use a multitude of sensors and software to operate. As with current vehicles, recalls may be issued for defective parts and/or software on the autonomous vehicle. In view of the autonomous nature of such vehicles, responding to a recall may be carried out in ways that are not possible with non-autonomous vehicles.

SUMMARY OF THE INVENTION

Methods, apparatuses, and products for administering a recall by an autonomous vehicle, including: receiving, by a vehicle management module, a recall message identifying a component of the autonomous vehicle that is subject to the recall; adjusting, by the vehicle management module, a vehicle capability in dependence upon the component of the autonomous vehicle that is subject to the recall; determining, by the vehicle management module, a recall response plan in dependence upon the adjusted vehicle capability; and executing, by the vehicle management module, the recall response plan.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
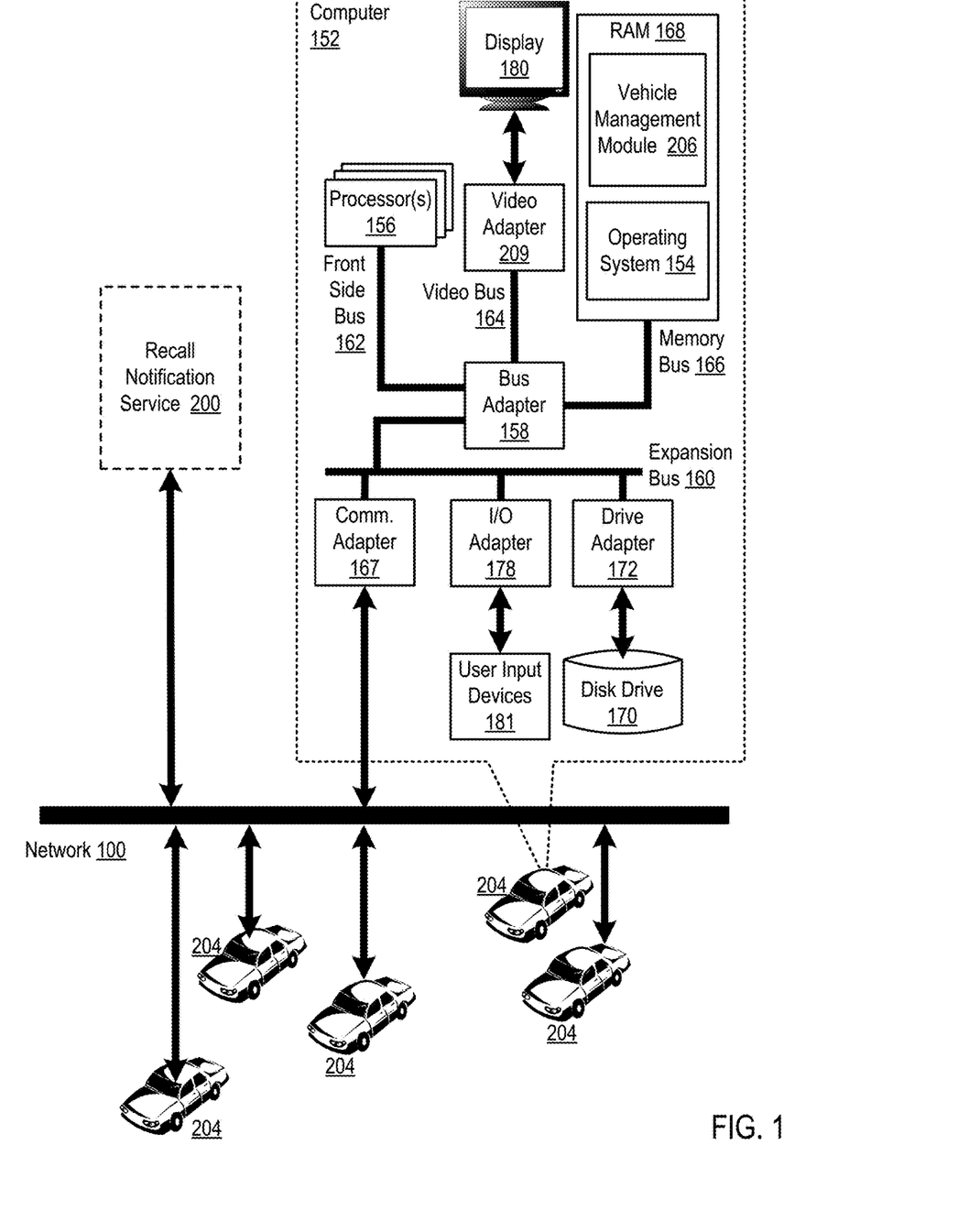
FIG. 1 sets forth a network diagram of a system for administering a recall by an autonomous vehicle according to embodiments of the present invention.

Example methods, apparatus, and products for administering a recall by an autonomous vehicle in accordance with the present invention are described with reference to the accompanying drawings, beginning with FIG. 1. FIG. 1 sets forth a network diagram of a system for administering a recall by an autonomous vehicle (204) according to embodiments of the present invention. The system of FIG. 1 includes a plurality of autonomous vehicles (204). Each autonomous vehicle (204) includes automated computing machinery in the form of an example computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for administering a recall by an autonomous vehicle according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards, mice, touchscreen displays, and so on. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus. The example computer (152) may also include various other components not shown here such as an altimeter, an accelerometer, a compass, a Global Positioning System ('GPS') receiver, and so on.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configure for administering a recall by an autonomous vehicle according to embodiments of the present invention include modems for wired dial-up communications, Ethernet (IEEE 802.3) adapters for wired data communications, and 802.11 adapters for wireless data communications. Other example protocols which may be supported by the communication adapter include: GSM (Global System For Mobile Communications) and CDMA (Code Division Multiple Access) protocols.

Stored in RAM (168) is a vehicle management module (206), a module of computer program instructions that, when executed by the processor (156), causes the computer (152) to operate for administering a recall by an autonomous vehicle in accordance with embodiments of the present invention. The vehicle management module (206) may be configured for receiving (208) a recall message (202) identifying a component of the autonomous vehicle (204) that is subject to the recall, adjusting (210) a vehicle capability in dependence upon the component of the autonomous vehicle (204) that is subject to the recall, determining (214) a recall response plan (216) in dependence upon the adjusted vehicle capability (212), and executing (218) the recall response plan (216) as described in greater detail below.

Also stored in RAM (168) is an operating system (154). Operating systems useful in computers configured for administering a recall by an autonomous vehicle according to embodiments of the present invention include UNIX™, Linux™, Microsoft XP™, AIX™, IBM's i5/OS™, and others as will occur to those of skill in the art. The operating system (154) and vehicle management module (206) in the example of FIG. 1 are shown in RAM (168), but many components of such software typically are stored in non-volatile memory also, such as, for example, on a disk drive (170).

The arrangement of autonomous vehicles, the recall notification service (200), and other components making up the example system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
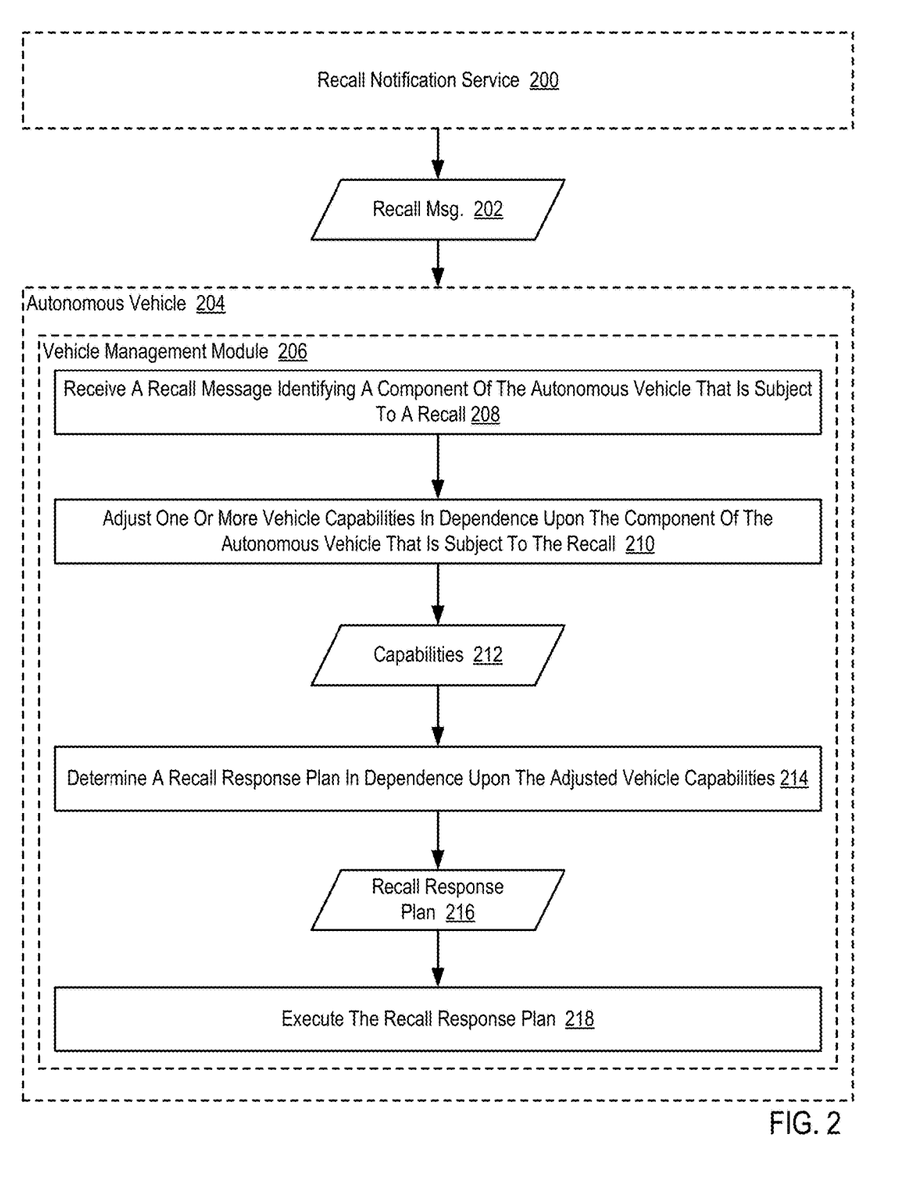
FIG. 2 sets forth a flow chart illustrating an example method for administering a recall by an autonomous vehicle according to embodiments of the present invention.

For further explanation, FIG. 2 sets forth a flow chart illustrating an example method for administering a recall by an autonomous vehicle (204) according to embodiments of the present invention. The autonomous vehicle (204) of FIG. 2 may also be referred to as a driverless car, self-driving car, robot car, or other moniker for an autonomous vehicle capable of fulfilling the human transportation capabilities of a traditional automobile, without the intervention of a human driver. Because the autonomous vehicle (204) is 'autonomous,' the autonomous vehicle (204) of FIG. 2 may be capable of sensing its environment and navigating without human input. Such an autonomous vehicle (204) may utilize technologies such as radar, lidar, global positioning system ('GPS'), computer vision, and others to sense their surroundings and to identify appropriate navigation paths, as well as obstacles and relevant signage.

The method depicted in FIG. 2 is carried out, at least in part, by a vehicle management module (206). In the example method of FIG. 2, the vehicle management module (206) may be embodied as a module of computer program instructions executing on computer hardware such as a computer processor. The vehicle management module (206) of FIG. 2 is depicted as residing within the autonomous vehicle (204) and may reside within a broader navigation control system that carries out many of the functions performed by the autonomous vehicle (204). While the method depicted in FIG. 2 is described as being carried out by a vehicle management module (206), readers will appreciate that the vehicle management module (206) may also be embodied as a plurality of distinct modules that collectively perform the operations described herein.

The example method depicted in FIG. 2 includes receiving (208), by a vehicle management module (206), a recall message (202) identifying a component of the autonomous vehicle (204) that is subject to a recall. A recall, as the term is used here, represents a request to return to the maker a batch or an entire production run of a product, usually due to the discovery of safety issues or a product defect. Such safety issues or product defects may be discovered through continued testing of the autonomous vehicle (204) by the manufacturer of the autonomous vehicle (204), through testing of the autonomous vehicle (204) by a safety agency that regulates the autonomous vehicle (204) industry, through continued use of the autonomous vehicle (204) by customers, and so on.

In the example method of FIG. 2, the recall message (202) is depicted as being received (208) from a recall notification service (200). The recall notification service (200) may be maintained, for example, by the manufacturer of the autonomous vehicle (204), by a third party organization such as a governmental safety agency that monitors and regulates autonomous vehicles (204), by a third party organization that provides subscription-based communications, in-vehicle security, hands free calling, turn-by-turn navigation, remote diagnostics systems, and other services, and so on.

In the example method of FIG. 2, the recall message (202) identifies a component of the autonomous vehicle (204) that is subject to a recall. The component of the autonomous vehicle (204) that is subject to a recall may be embodied, for example, as a mechanical system of the autonomous vehicle (204) such as the braking system, as one or more mechanical parts of the autonomous vehicle (204) such as the shocks of the autonomous vehicle (204), as a computerized system of the autonomous vehicle (204) such as the navigation control system that enables the autonomous vehicle (204) to navigate itself without human input, and so on. The recall message (202) of FIG. 2 may identify a component of the autonomous vehicle (204) that is subject to a recall, for example, by including data in the recall message (202) that specifies a part number or other known identifier of the component of the autonomous vehicle (204) that is subject to the recall.

The example method depicted in FIG. 2 also includes adjusting (210), by the vehicle management module (206), one or more vehicle capabilities (212) in dependence upon the component of the autonomous vehicle (204) that is subject to the recall. In the example method of FIG. 2, the one or more vehicle capabilities (212) represent a function that may be performed by the autonomous vehicle (204). The one or more vehicle capabilities (212) may include, for example, the ability of the autonomous vehicle (204) to navigate itself, the ability of the autonomous vehicle (204) to traverse certain routes, the ability of the autonomous vehicle (204) to be driven with human assistance, the ability of the autonomous vehicle (204) to signal that the autonomous vehicle (204) is turning through the use of a turn signal, and so on. In the example method of FIG. 2, adjusting (210) the one or more vehicle capabilities (212) in dependence upon the component of the autonomous vehicle (204) that is subject to the recall may be carried out, for example, by identifying all vehicle capabilities that rely upon the component of the autonomous vehicle (204) that is subject to the recall.

Consider an example in which the component of the autonomous vehicle (204) that is subject to the recall is software within the navigation control system of the autonomous vehicle (204). In such an example, the ability of the autonomous vehicle (204) to navigate itself would be greatly comprised by the existence of faulty software within the navigation control system of the autonomous vehicle (204). As such, the capability (212) representing the ability of the autonomous vehicle (204) to navigate itself could be adjusted (210) so as to disable such a capability (212). In such an example, however, the ability of the autonomous vehicle (204) to be driven with human assistance may not be comprised by the existence of faulty software within the navigation control system of the autonomous vehicle (204). The capability (212) where the autonomous vehicle (204) can be driven with human assistance may therefore not be adjusted in spite of the recall of software within the navigation control system of the autonomous vehicle (204).

Consider an additional example in which the component of the autonomous vehicle (204) that is subject to the recall is the braking system of the autonomous vehicle (204). In such an example, the ability of the autonomous vehicle (204) to navigate itself would be greatly comprised and the ability of the autonomous vehicle (204) to be driven with human assistance would also be greatly comprised by the existence of a defect in the braking system of the autonomous vehicle (204). In such an example, all capabilities (212) of the autonomous vehicle (204) may be adjusted (210) such that the autonomous vehicle (204) is disabled from all forms of driving until the braking system is repaired.

In order to adjust (210) one or more vehicle capabilities (212) in dependence upon the component of the autonomous vehicle (204) that is subject to the recall, the vehicle management module (206) may maintain a data repository such as a table, database, or other data structure that associates each component of the autonomous vehicle (204) with one or more capabilities of the autonomous vehicle (204). For example, the vehicle management module (206) may maintain a table as illustrated below:

TABLE 1

Capability/Component Relationship Table

| Component ID | Component Desc. | Capability ID | Capability Desc. |
| --- | --- | --- | --- |
| 1 | Nav. Control Sys. | 1 | Self-Driving |
| 2 | Braking System | 1 | Self-Driving |
| 3 | Turn Signals | 1 | Self-Driving |
| 4 | Brake Lights | 1 | Self-Driving |
| 2 | Braking System | 2 | Assisted Driving |
| 3 | Turn Signals | 2 | Assisted Driving |
| 4 | Brake Lights | 2 | Assisted Driving |
| 5 | Speech Rec. Sys. | 3 | Hands Free Calling |

Table 1 includes entries for five components of the autonomous vehicle (204). The five components include the navigation control system that performs many of the autonomous driving functions for the autonomous vehicle (204), the braking system that is responsible for stopping and slowing down the autonomous vehicle (204) while the autonomous vehicle (204) is moving, the turn signals of the autonomous vehicle (204) that are used to alert other drivers that the autonomous vehicle (204) will be turning or switching lanes, the brake lights for the autonomous vehicle (204) that are used to alert other drivers that the autonomous vehicle (204) has engaged its braking system, and the speech recognition system of the autonomous vehicle (204) that is used by a driver of the autonomous vehicle (204) to deliver voice commands to subsystems within the autonomous vehicle (204). Table 1 also includes entries for three capabilities of the autonomous vehicle (204). The three capabilities of the autonomous vehicle (204) include the ability of the autonomous vehicle (204) to drive itself, the ability of the autonomous vehicle (204) to be driven by a human operator, and the ability of the autonomous vehicle (204) to perform hands free calling operations where a driver of the autonomous vehicle (204) can initiate a telephone call via a voice command.

Each entry in Table 1 associates a particular capability with a particular component of the autonomous vehicle (204). The presence of such an entry indicates that a particular capability is dependent upon a particular component of the autonomous vehicle (204). For example, the self-driving capability of the autonomous vehicle (204) is dependent upon the navigation control system, the braking system, the turn signals, and the brake lights of the autonomous vehicle (204). Similarly, the assisted driving capability of the autonomous vehicle (204) is also is dependent upon the braking system, the turn signals, and the brake lights of the autonomous vehicle (204). Readers will appreciate, however, that the assisted driving capability of the autonomous vehicle (204) is not dependent upon the navigation control system of the autonomous vehicle (204), as a human operator is responsible for navigating the autonomous vehicle (204) in order to carry out the assisted driving capability of the autonomous vehicle (204).

In the example method of FIG. 2, adjusting (210) the one or more vehicle capabilities (212) in dependence upon the component of the autonomous vehicle (204) that is subject to the recall may therefore be carried out by first identifying the capabilities (212) of the autonomous vehicle (204) that are dependent upon the component of the autonomous vehicle (204) that is subject to the recall. In such an example, identifying the capabilities (212) of the autonomous vehicle (204) that are dependent upon the component of the autonomous vehicle (204) that is subject to the recall may be carried out by looking up the capabilities (212) of the autonomous vehicle (204) that are dependent upon the component of the autonomous vehicle (204) that is subject to the recall in a table such as Table 1.

In the example method of FIG. 2, adjusting (210) the one or more vehicle capabilities (212) may be carried out, for example, by disabling a particular capability, by enabling a particular capability, by restricting the extent to which a particular capability may be delivered, and so on. In the example method of FIG. 2, adjusting (210) the one or more vehicle capabilities (212) may be carried out by changing values in a data repository such as a table, database, or other data structure that associates various capabilities with values that identify the extent to which a particular capability is enabled. For example, the vehicle management module (206) may maintain a table as illustrated below:

TABLE 2

Capabilities/Capability Values Table

| Capability ID | Capability Description | Capability Value |
| --- | --- | --- |
| 1 | Self-Driving | On |
| 2 | Assisted Driving | On |
| 3 | Hands Free Calling | On |
| 4 | Max Speed | 40 MPH |
| 5 | Max Distance | 30 Miles |
| 6 | Toll Road Navigation | Off |
| 7 | Night-time Self-Driving | Off |
| 8 | Night-time Assist. Driving | On |

Table 2 depicts entries for eight capabilities and the autonomous vehicle (204) as well as values identifying the extent to which each of the eight capabilities can be delivered. In the example method of FIG. 2, adjusting (210) the one or more vehicle capabilities (212) may be carried out by adjusting the value associated with a particular capability, thereby altering the extent to which a particular capability may be carried out.

Consider an example in which a recall message (202) is received (208) indicating that the navigation control system of the autonomous vehicle (204) is subject to a recall. In such an example, the vehicle management module (206) may identify the capabilities of the autonomous vehicle (204) that are dependent upon the navigation control system by performing a lookup operation in a data repository such as Table 1. In such an example, the vehicle management module (206) would determine that self-driving capability is dependent upon the navigation control system. The vehicle management module (206) may subsequently adjust (210) the self-driving capability by changing the capability value for the self-driving capability in a data repository such as Table 2. In such an example, by changing the capability value for the self-driving capability from 'On' to 'Off,' the self-driving capability of the autonomous vehicle may be disabled.

The example method depicted in FIG. 2 also includes determining (214), by the vehicle management module (206), a recall response plan (216) in dependence upon the one or more vehicle capabilities (212). In the example method of FIG. 2, the recall response plan (216) can represent a planned course of action for responding to the recall message (202). Such a recall response plan (216) can include, for example, presenting an alert to the owner of the autonomous vehicle (204) indicating that a component part of the autonomous vehicle (204) is subject to a recall, sending a message to the manufacturer of the autonomous vehicle (204) requesting an appointment for performing a repair on the autonomous vehicle (204), the autonomous vehicle (204) driving itself to the repair facilities of the manufacturer of the autonomous vehicle (204), and so on.

The recall response plan (216) of FIG. 2 is determined (214) in dependence upon the one or more vehicle capabilities (212) in the sense that the recall response plan (216) cannot include the autonomous vehicle (204) taking any actions that require capabilities not currently possessed or enabled by the autonomous vehicle (204). Consider an example in which a recall message (202) is received (208) indicating that the navigation control system of the autonomous vehicle (204) is subject to a recall, such that the self-driving capability of the autonomous vehicle (204) is subsequently adjusted (210) to be disabled. In such an example, the recall response plan (216) cannot include the autonomous vehicle (204) driving itself to the repair facilities of the manufacturer of the autonomous vehicle (204). In order to determine (214) the recall response plan in dependence upon the one or more vehicle capabilities (212), the vehicle management module (206) may retain a data repository such as a table, database, or other data structure that associates potential recall response actions with capabilities of the autonomous vehicle (204) that are required to perform the recall response actions. For example, the vehicle management module (206) may maintain a table as illustrated below:

TABLE 3

Recall Action/Capabilities Relationship Table

| Recall Action ID | Recall Action Description | Capability Requirements |
|---|---|---|
| 1 | Alert Message | 1 = 'On', 2 = 'On' |
| 2 | Message to Manufacturer | 1 = 'On', 3 = 'On' |
| 3 | Request a Tow Truck | 1 = 'On', 3 = 'On' |

TABLE 3-continued

Recall Action/Capabilities Relationship Table

| Recall Action ID | Recall Action Description | Capability Requirements |
|---|---|---|
| 4 | Download Software | 2 = 'On', 3 = 'On' |
| 5 | Self-Drive to Repair Shop | 1 = 'On', 4 >= '40 MPH' |

Table 3 includes entries for five potential recall actions that can be included in a recall response plan. Such recall actions include delivering an alert message (e.g., over a display screen in the autonomous vehicle), sending a message to the manufacturer of the autonomous vehicle (204) such as a request for a service appointment, sending a request for a tow truck, downloading software such as a patch to the navigation control system, and the autonomous vehicle (204) driving itself to a service facility. Each entry in Table 3 also identifies the various capabilities of the autonomous vehicle, as well as the capability values, that are required to perform the associated recall action. In the example method of FIG. 2, recall actions that are associated with capability requirements that are not met by the current capabilities of the autonomous vehicle (204) may be excluded from inclusion in the recall response plan (216).

The example method depicted in FIG. 2 also includes executing (218), by the vehicle management module (206), the recall response plan (216). Executing (218) the recall response plan (216) may be carried out, for example, by the autonomous vehicle (204) executing computer program instructions designed to carry out each recall action in the recall response plan (216). The vehicle management module (206) may, for example, initiate the execution of a message delivery function, initiate the execution of a self-driving function, and so on.

Figure 3:
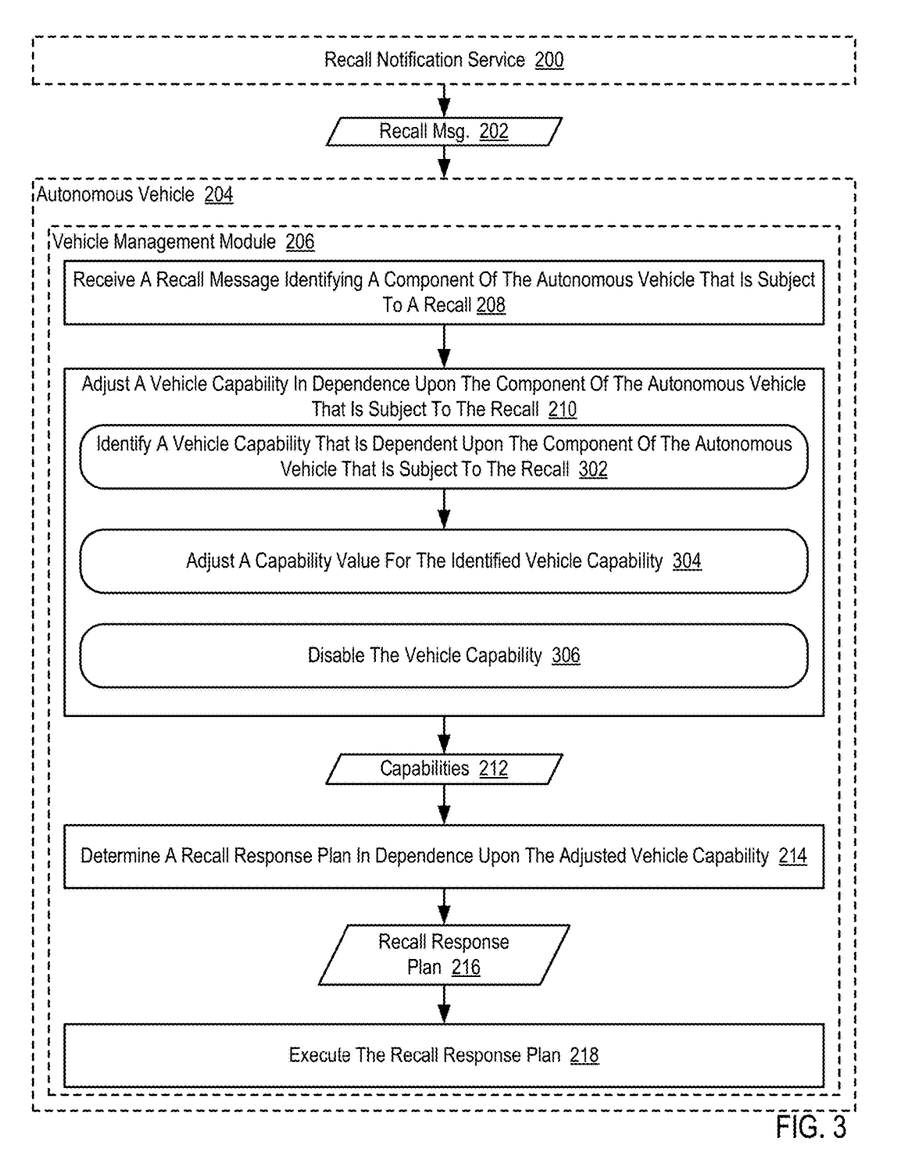
FIG. 3 sets forth a flow chart illustrating an additional example method for administering a recall by an autonomous vehicle according to embodiments of the present invention.

For further explanation, FIG. 3 sets forth a flow chart illustrating an additional example method for administering a recall by an autonomous vehicle (204) according to embodiments of the present invention. The example method depicted in FIG. 3 is similar to the example method depicted in FIG. 2, as it also includes receiving (208) a recall message (202) identifying a component of the autonomous vehicle (204) that is subject to the recall, adjusting (210) a vehicle capability in dependence upon the component of the autonomous vehicle (204) that is subject to the recall, determining (214) a recall response plan (216) in dependence upon the adjusted vehicle capability (212), and executing (218) the recall response plan (216).

In the example method depicted in FIG. 3, adjusting (210) a vehicle capability in dependence upon the component of the autonomous vehicle (204) that is subject to the recall can include identifying (302) a vehicle capability that is dependent upon the component of the autonomous vehicle (204) that is subject to the recall. In the example method of FIG. 3, identifying (302) a vehicle capability that is dependent upon the component of the autonomous vehicle (204) that is subject to the recall may be carried out, for example, by receiving an identifier of the component of the autonomous vehicle (204) that is subject to the recall in a recall message (202) and looking up such an identifier in a data repository that associates components of the autonomous vehicle (204) with capabilities that are dependent upon such components of the autonomous vehicle (204). Such a data repository that associates components of the autonomous vehicle (204) with capabilities that are dependent upon such components of the autonomous vehicle (204) may be embodied, for example, as a table such as Table 1 included above.

In the example method depicted in FIG. 3, adjusting (210) a vehicle capability in dependence upon the component of the autonomous vehicle (204) that is subject to the recall can also include adjusting (304) a capability value for the identified vehicle capability. Adjusting (304) a capability value for the identified vehicle capability may be carried out, for example, by updating an entry in a data repository that associates vehicle capabilities with capability values defining the extent to which an autonomous vehicle (204) is enabled to perform a certain vehicle capability. Such a data repository may be embodied, for example, as a table such as Table 2 depicted above.

In the example method depicted in FIG. 3, adjusting (210) a vehicle capability in dependence upon the component of the autonomous vehicle (204) that is subject to the recall can include disabling (306) the vehicle capability. In the example method of FIG. 3, disabling (306) the vehicle capability may be carried out by updating an entry in a data repository that associates vehicle capabilities with capability values defining the extent to which an autonomous vehicle (204) is enabled to perform a certain vehicle capability. In such an example, a disabled vehicle capability represents a vehicle capability that the autonomous vehicle (204) is entirely unable to perform. For example, disabling a self-driving capability of an autonomous vehicle (204) would result in the autonomous vehicle (204) being unable to traverse a route without human interaction.

Figure 4:
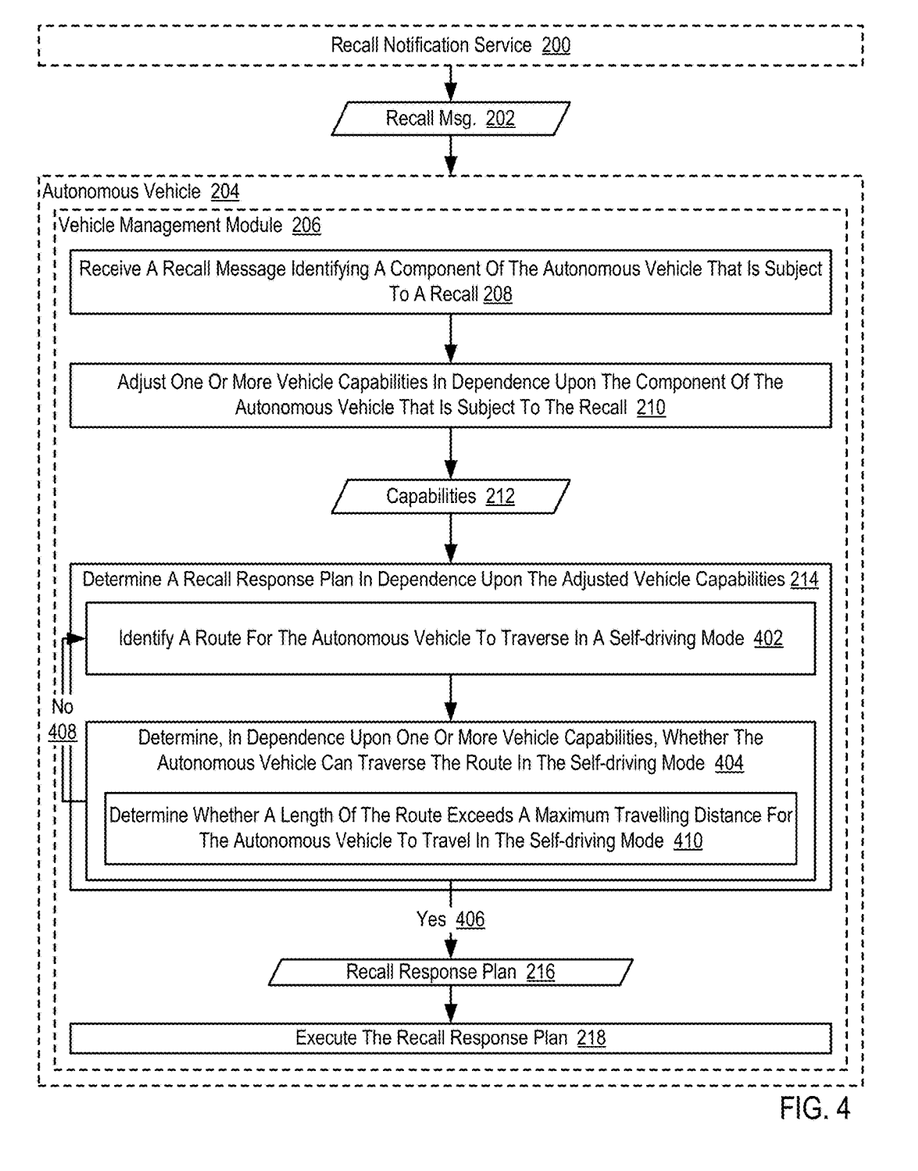
FIG. 4 sets forth a flow chart illustrating an additional example method for administering a recall by an autonomous vehicle according to embodiments of the present invention.

For further explanation, FIG. 4 sets forth a flow chart illustrating an additional example method for administering a recall by an autonomous vehicle (204) according to embodiments of the present invention. The example method depicted in FIG. 4 is similar to the example method depicted in FIG. 2, as it also includes receiving (208) a recall message (202) identifying a component of the autonomous vehicle (204) that is subject to the recall, adjusting (210) a vehicle capability in dependence upon the component of the autonomous vehicle (204) that is subject to the recall, determining (214) a recall response plan (216) in dependence upon the adjusted vehicle capability (212), and executing (218) the recall response plan (216).

In the example method of FIG. 4, determining (214) a recall response plan (216) in dependence upon the adjusted vehicle capability (212) can include identifying (402) a route for the autonomous vehicle (204) to traverse in a self-driving mode. In the example method of FIG. 4, the recall response plan (216) can include the autonomous vehicle (204) driving itself to a repair facility, such that the manufacturer of the autonomous vehicle (204) or other repair technician can service the autonomous vehicle (204) and repair, replace, or otherwise service the component of the autonomous vehicle (204) that is subject to the recall. In such an example, the autonomous vehicle (204) can identify (402) one or more available routes for the autonomous vehicle (204) to traverse in a self-driving mode. The autonomous vehicle (204) can identify (402) the one or more available routes for the autonomous vehicle (204) to traverse in a self-driving mode, for example, by the autonomous vehicle (204) determining its location (e.g., global positioning system ('GPS') coordinates) and using a mapping function to determine available routes between its current location and the repair facility.

In the example method of FIG. 4, determining (214) a recall response plan (216) in dependence upon the adjusted vehicle capability (212) can also include determining (404), in dependence upon one or more vehicle capabilities (202), whether the autonomous vehicle (204) can traverse the route in the self-driving mode. Consider an example in which the capabilities of the autonomous vehicle (204) are limited such that the top speed that the autonomous vehicle (204) may reach in a self-driving mode is 40 MPH. In such an example, the autonomous vehicle (204) may disregard any potential routes that would require the autonomous vehicle (204) to drive on a highway with a speed limit of 65 MPH. Consider an additional example in which the capabilities of the autonomous vehicle (204) are limited such that the autonomous vehicle (204) is not authorized to self-drive on toll roads. In such an example, the autonomous vehicle (204) may disregard any potential routes that would require the autonomous vehicle (204) to drive on a toll road.

In the example method of FIG. 4, determining (404), in dependence upon one or more vehicle capabilities (202), whether the autonomous vehicle (204) can traverse the route in the self-driving mode may be carried out by comparing one or more requirements associated with the route with the capabilities of the autonomous vehicle (204). The one or more requirements of the route can include, for example, the length of the route in terms of mileage, the length of the route in terms of estimated time required to traverse the route, the speed limits associated with a plurality of segments of the route, the types of roads that are included in the route (e.g., a toll road), and so on. For example, determining (404) whether the autonomous vehicle (204) can traverse the route in the self-driving mode can include determining (410) whether a length of the route exceeds a maximum travelling distance for the autonomous vehicle (204) to travel in the self-driving mode. In the example method of FIG. 4, the one or more requirements associated with the route may be received, for example, from a mapping application for identifying a route between two locations.

In the example method of FIG. 4, if the vehicle management module (206) affirmatively (406) determines that the autonomous vehicle (204) can traverse the route in the self-driving mode, a recall response plan (216) that includes the autonomous vehicle (204) traversing the route in self-driving mode can be executed (218). If the vehicle management module (206) determines that the autonomous vehicle (204) is not (408) able to traverse the route in the self-driving mode, execution of the method depicted in FIG. 4 can return to step 402 such that another route may be identified (402).

Figure 5:
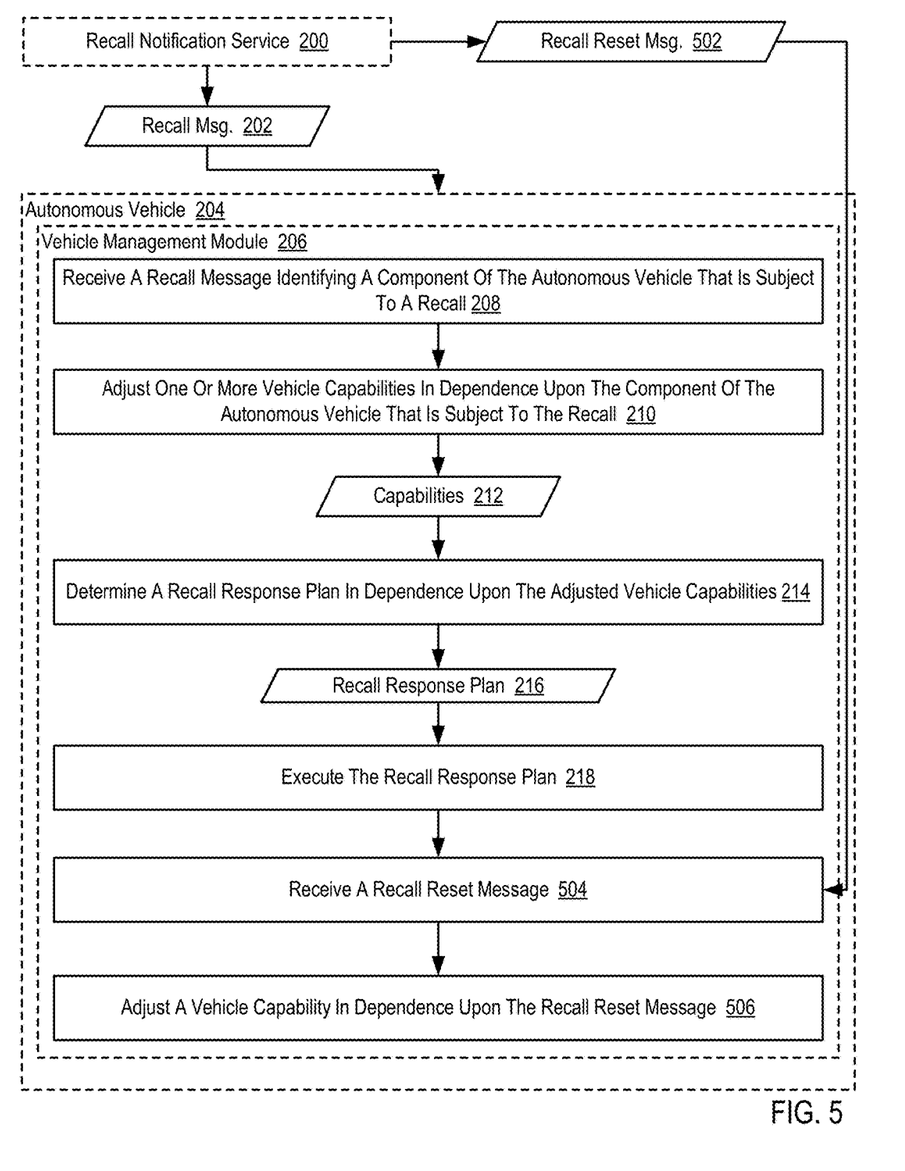
FIG. 5 sets forth a flow chart illustrating an additional example method for administering a recall by an autonomous vehicle according to embodiments of the present invention.

For further explanation, FIG. 5 sets forth a flow chart illustrating an additional example method for administering a recall by an autonomous vehicle (204) according to embodiments of the present invention. The example method depicted in FIG. 5 is similar to the example method depicted in FIG. 2, as it also includes receiving (208) a recall message (202) identifying a component of the autonomous vehicle (204) that is subject to the recall, adjusting (210) a vehicle capability in dependence upon the component of the autonomous vehicle (204) that is subject to the recall, determining (214) a recall response plan (216) in dependence upon the adjusted vehicle capability (212), and executing (218) the recall response plan (216).

The example method depicted in FIG. 5 also includes receiving (504), by the vehicle management module (206), a recall reset message (502). In the example method of FIG. 5, a recall reset message (502) represents a message indicating that the autonomous vehicle (204) is no longer subject to the recall identified in the recall message (202). The recall reset message (502) may be sent by the recall notification service (200), for example, after the autonomous vehicle (204) has been serviced in response to receiving the recall message (202).

The example method depicted in FIG. 5 also includes adjusting (506), by the vehicle management module (206), a vehicle capability in dependence upon the recall reset message (502). In the example method of FIG. 5, upon receipt of the recall reset message (502), vehicle capabilities that were adjusted in step 210 may be readjusted back to their previous values, in view of the fact that the recall message (202) has been serviced. As such, the vehicle management module (206) may adjust (506) a vehicle capability in response to receiving the recall reset message (502). The recall reset message (502) may include a new value for or particular capability, the vehicle capability may be reset to a previous value, or the vehicle capability may otherwise be adjusted (502) in response to receiving the recall reset message (502).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by computer instructions on a computing device, receiving from a recall notification service external to an autonomous vehicle, a recall message identifying a component of the autonomous vehicle that is subject to the recall;
adjusting a vehicle capability in dependence upon the component of the autonomous vehicle that is subject to the recall includes:
identifying a vehicle capability that is dependent upon the component of the autonomous vehicle that is subject to the recall; and
adjusting a capability value for the identified vehicle capability;
determining, in dependence upon the adjusted vehicle capability, a recall response plan representing a course of action for responding to the recall message, wherein the recall response plan excludes actions that are associated with vehicle capability requirements that are not met by current vehicle capabilities of the vehicle including the adjusted vehicle capability; and
executing the recall response plan.

2. The method of claim 1 wherein adjusting the vehicle capability in dependence upon the component of the autonomous vehicle that is subject to the recall further comprises disabling the vehicle capability.

3. The method of claim 1 wherein determining the recall response plan in dependence upon the adjusted vehicle capability further comprises:
identifying a route for the autonomous vehicle to traverse in a self-driving mode; and
determining, in dependence upon one or more vehicle capabilities, whether the autonomous vehicle can traverse the route in the self-driving mode.

4. The method of claim 3 wherein determining whether the autonomous vehicle can traverse the route in the self-driving mode further comprises determining whether a length of the route exceeds a maximum travelling distance for the autonomous vehicle to travel in the self-driving mode.

5. The method of claim 1 further comprising:
receiving a recall reset message; and
adjusting a vehicle capability in dependence upon the recall reset message.

6. An apparatus comprising a computer processor and a computer memory operatively coupled to the computer processor, the computer memory having disposed within it computer program instructions that, when executed by the computer processor, cause the apparatus to carry out the steps of:
receiving from a recall notification service external to an autonomous vehicle, a recall message identifying a component of the autonomous vehicle that is subject to the recall;
adjusting a vehicle capability in dependence upon the component of the autonomous vehicle that is subject to the recall includes:
identifying a vehicle capability that is dependent upon the component of the autonomous vehicle that is subject to the recall; and
adjusting a capability value for the identified vehicle capability;
determining, in dependence upon the adjusted vehicle capability, a recall response plan representing a course of action for responding to the recall message, wherein the recall response plan excludes actions that are associated with vehicle capability requirements that are not met by current vehicle capabilities of the vehicle including the adjusted vehicle capability; and
executing the recall response plan.

7. The apparatus of claim 6 wherein adjusting the vehicle capability in dependence upon the component of the autonomous vehicle that is subject to the recall further comprises disabling the vehicle capability.

8. The apparatus of claim 6 wherein determining the recall response plan in dependence upon the adjusted vehicle capability further comprises:
identifying a route for the autonomous vehicle to traverse in a self-driving mode; and
determining, in dependence upon one or more vehicle capabilities, whether the autonomous vehicle can traverse the route in the self-driving mode.

9. The apparatus of claim 8 wherein determining whether the autonomous vehicle can traverse the route in the self-driving mode further comprises determining whether a length of the route exceeds a maximum travelling distance for the autonomous vehicle to travel in the self-driving mode.

10. The apparatus of claim 6 further comprising computer program instructions that, when executed by the computer processor, cause the apparatus to carry out the steps of:
receiving a recall reset message; and
adjusting a vehicle capability in dependence upon the recall reset message.

11. A computer program product including a computer readable storage medium comprising computer program instructions that, when executed, cause a computer to carry out the steps of:
receiving from a recall notification service external to the vehicle, a recall message identifying a component of the autonomous vehicle that is subject to the recall;
adjusting a vehicle capability in dependence upon the component of the autonomous vehicle that is subject to the recall includes:
identifying a vehicle capability that is dependent upon the component of the autonomous vehicle that is subject to the recall; and
adjusting a capability value for the identified vehicle capability;
determining, in dependence upon the adjusted vehicle capability, a recall response plan representing a course of action for responding to the recall message, wherein the recall response plan excludes actions that are associated with vehicle capability requirements that are not met by current vehicle capabilities of the vehicle including the adjusted vehicle capability; and
executing the recall response plan.

12. The computer program product of claim 11 wherein adjusting the vehicle capability in dependence upon the component of the autonomous vehicle that is subject to the recall further comprises disabling the vehicle capability.

13. The computer program product of claim 11 wherein determining the recall response plan in dependence upon the adjusted vehicle capability further comprises:
identifying a route for the autonomous vehicle to traverse in a self-driving mode; and determining, in dependence upon one or more vehicle capabilities, whether the autonomous vehicle can traverse the route in the self-driving mode.

14. The computer program product of claim 13 wherein determining whether the autonomous vehicle can traverse the route in the self-driving mode further comprises determining whether a length of the route exceeds a maximum travelling distance for the autonomous vehicle to travel in the self-driving mode.

15. The computer program product of claim 11 further comprising computer program instructions that, when executed, cause the computer to carry out the steps of:
   receiving a recall reset message; and
   adjusting a vehicle capability in dependence upon the recall reset message.

* * * * *